United States Patent [19]  [11] 4,323,446
Chervenak et al.  [45] Apr. 6, 1982

[54] MULTI-ZONE COAL CONVERSION PROCESS USING PARTICULATE CARRIER MATERIAL

[75] Inventors: Michael C. Chervenak, Pennington; Edwin S. Johanson, Princeton; Marvin S. Rakow, East Brunswick, all of N.J.

[73] Assignee: Hydrocarbon Research, Inc., Lawrenceville, N.J.

[21] Appl. No.: 71,215

[22] Filed: Aug. 30, 1979

[51] Int. Cl.$^3$ .............................. C10G 1/00; C10J 3/00
[52] U.S. Cl. .................................... 208/8 R; 48/206; 48/210
[58] Field of Search .................. 208/8 R; 48/206, 210

[56] References Cited

U.S. PATENT DOCUMENTS

| | | | |
|---|---|---|---|
| 2,861,943 | 11/1958 | Finneran et al. | 208/59 |
| 3,167,494 | 1/1965 | Crawford | 208/8 R |
| 3,565,766 | 2/1971 | Eddinger et al. | 208/8 R X |
| 3,817,723 | 6/1974 | Donath | 208/8 R X |
| 4,055,484 | 10/1977 | Blaser et al. | 48/206 X |
| 4,110,193 | 8/1978 | Gwyn et al. | 208/8 R |
| 4,183,800 | 1/1980 | Mitchell et al. | 208/8 R |
| 4,213,826 | 7/1980 | Eddinger et al. | 208/8 R X |

*Primary Examiner*—Delbert E. Gantz
*Assistant Examiner*—William G. Wright
*Attorney, Agent, or Firm*—Vincent A. Mallare; Fred A. Wilson

[57] ABSTRACT

A multiple-zone fluidized bed coal conversion process for producing fuel gas and distillate liquid products. The coal is fed into an upper fluidized bed maintained at 950°–1500° F. for devolatilization. The resulting coke and some tars are deposited on a particulate carrier material, which descends along with the larger particles of unreacted coal through a stripping zone into a lower fluidized bed gasification zone, which is maintained at 1700°–2000° F. by steam and O$_2$-containing gas introduced therein to gasify the coke and char. Fine particles of unreacted coal and carrier are passed with gas and distillate vapor through a cyclone gas-solids separation step located in the devolatilization zone, from which the solids are returned to the lower bed for further gasification. Ash produced in the lower bed along with the clean hot particulate carrier is transferred through an up-transport tube to the upper bed. The effluent from the devolatilization/hydrogenation zone passes through an external cyclone separator which removes the particles as a disposal stream. Alternatively, the effluent from the devolatilization zone may be passed through a third or uppermost bed of particulate carrier material for heat recovery and more complete removal of tars from the product gas.

14 Claims, 2 Drawing Figures

MULTI-ZONE COAL CONVERSION PROCESS USING PARTICULATE CARRIER MATERIAL

BACKGROUND OF THE INVENTION

1. Field of the Invention

This invention pertains to an improved multiple zone coal conversion process for producing fuel gas and distillate liquids, and particularly to such a coal conversion process wherein coal is devolatilized in an upper bed of particulate carrier material which is used to facilitate the gasification of adsorbed coke in a lower combustion zone.

2. Description of Prior Art

Considerable work has previously been done for the multi-stage gasification of heavy oil feeds in fluidized beds, some processes using a particulate carrier material for deposition of carbon, and for the multiple stage gasification of coal. Some typical pertinent patents include U.S. Pat. No. 2,861,943 to Finneran which teaches the use of a circulating particulate carrier for coke laydown from a residual oil feedstock, but does not teach use of such carrier material for tar deposition from coal gasification processes in which the tar is formed within the process. U.S. Pat. No. 3,202,603 to Keith teaches a multiple bed hydro-gasification process for residual oils and tar feeds and using a particulate carrier material for hydrocracking the heavy oil feed to produce gas and liquid fractions. But no mention is made of removing tars, particularly from coal feeds.

U.S. Pat. No. 3,953,180 to Hoffert discloses a gasification process for petroleum residuum feedstocks, which utilizes a heat exchange step in an upper fluidized bed to cool the product gas stream before use as gas turbine fuel. However, no mention is made of gasification of coal or the deposition of tars on a circulating carrier material.

U.S. Pat. No. 3,817,732 to Donath teaches two-stage gasification of coal in separate reactors, but does not utilize a circulating particulate contact material for removal of tars from product gas. U.S. Pat. No. 3,847,563 to Archer teaches a multiple stage gasification process for coal which uses a fluidized bed of limestone (CaO) or dolomite to absorb sulfur from the gas generated. Also, two separate reactor vessels are used instead of a single vessel having multiple reaction zones.

U.S. Pat. No. 4,099,933 to Johnson describes a multiple zone gasification process for coal designed to prevent carryover of tars with the product gas stream by using staged beds of coal at increasing temperature levels. However, a particulate carrier material is not used for deposition of such tars.

There has thus been an unfulfilled need for a practical coal conversion and gasification process to produce fuel gas and distillable liquids, which would also effectively react tars evolved from the coal and produce clean fuel gas and liquid products.

SUMMARY OF THE INVENTION

This invention provides a multiple zone coal conversion process of producing fuel gas and distillable liquid products. It utilizes a pressurized reactor having at least two zones containing fluidized beds and associated gas-solids separation steps and equipment. Crushed coal is fed into a pressurized upper fluidized bed zone containing a particulate carrier material, wherein the coal is devolatilized at 900°–1500° F. temperature range in a reducing gas atmosphere. Some hydrocarbon gases are formed along with tars, which are adsorbed on the particulate carrier material where they are hydrocracked to produce principally distillate liquids and coke. The carrier material with residual coke deposits then descends along with the larger unconverted coal particles (char) through a stripping zone into a lower fluidized bed gasification zone maintained at higher temperatures of 1700°–2000° F. for gasification of the tars and unconverted coal particles (char). The stripping section eliminates backmixing of the char particles and provides a temperature gradient between the upper coal devolatilization zone and the lower gasification zone.

Steam and oxygen containing gas are introduced into the gasification zone in sufficient quantity to maintain the bed at 1700°–2000° F. temperature range, so as to gasify the char and also the coke deposits on the carrier material. The resulting gas and light hydrocarbons produced in the lower zone pass upwardly through the stripping zone and enter the devolatilization. Larger ash particles are withdrawn from the bottom zone of the reactor, as needed.

The particulate carrier material is selected to have characteristics suitable for deposition of coal tars and coke and to be abrasion resistant. The carrier is continuously recirculated to provide the surface area for coal tar and coke deposition, and provides the means for moving carbon from the devolatilization zone to the lower zone for gasification and to provide heat for the devolatilization zone. Minor make-up of carrier material will replace any carrier lost along with the ash withdrawn from the reactor bottom zone and by normal attrition.

The resulting product gas and liquids, along with fine particles of unconverted coal and particulate adsorbent carrier material, are passed from the upper devolatilization zone through a gas-solids separation step, where the solids are substantially removed and returned to the bottom zone for combustion. Fine ash, produced in the lower gasification zone, is conveyed upward along with carrier material by pressurized steam or product gas back to the upper bed. The effluent gas and liquid products, along with a minor amount of solid particles, are withdrawn and pass through an external gas-solids separation step for further removal of unconverted coal and ash solids. The effluent gas stream is cooled, such as in a waste heat boiler to produce steam. The resulting products comprise principally fuel gas of medium Btu heating value and distillate liquids. Depending upon operating conditions used, product distribution may range between about 30–70 wt. percent gas with the balance being distillate liquid product, with the preferred product distribution being about 40–50% gas product.

This novel concept of using a particulate carrier material continuously circulated between an upper fluidized bed coal devolatilization zone and a lower fluidized bed combustion or gasification zone to convert tars and gasify coke formed from the coal conversion-gasifications system provides a significant advancement in the art of coal conversion.

DETAILED DESCRIPTION OF THE INVENTION

The present invention discloses an improved multiple zone process for converting coal into fuel gas product, such as medium Btu heating value gas, and distillable liquid products, utilizing a pressurized reactor having at least two fluidized bed zones and associated separation and gas cleaning equipment. The crushed coal is fed, either in dry form or preferably as a slurry, into a pressurized upper fluidized bed zone of the reactor containing a particulate carrier material for devolatilization and hydrogenation of the coal at 900°-1500° F. temperature range, and preferably 1000°-1400° F. in a reducing gas atmosphere. Pressure should be at least 100 psig, and is preferably 150-800 psig. Hydrocarbon gases are formed and the tars produced from the coal devolatilization are adsorbed onto the particulate carrier material. There they are hydrocracked to produce principally distillate liquids and some coke residue. The carrier containing residual coke deposits descends along with the larger unconverted coal particles (char) down through a stripping section containing a coarse packing material, and then into a lower fluidized bed gasification zone maintained at appreciably higher temperature, such as in the range of 1700°-2000° F. and preferably 1725°-1950° F., for gasification of the coke and unconverted coal. The stripping zone serves to eliminate backmixing of the char so as to provide the temperature gradient needed between the upper devolatilization zone and lower gasification zone.

Pressurized steam and oxygen-containing gas are introduced into the lower gasification zone in sufficient quantity to maintain the char therein at 1700°-2000° F. range, so as to gasify the char and coke deposits on the carrier material, but avoid appreciable agglomeration of the ash. The weight ratio of oxygen/carbon should be about 1.2 to 1.7, and the mol ratio of steam/oxygen should be about 1.5 to 5.0, with 2.0 to 4.0 being preferred. The resulting gas and light hydrocarbons produced in the gasification zone flow upwardly through the stripping zone, which provides a temperature gradient of at least about 200° F. and preferably 300°-900° F. between the devolatilization and gasification zones. The stripping section also serves to strip the lighter liquids which have been adsorbed on the carrier material with the upward countercurrently flowing gas produced in the lower combustion or gasification zone.

After removal of deposited coke from the carrier material has occurred in the lower gassification zone, the particulate carrier is recirculated to the devolatilization zone via a transport tube using a carrier fluid. Such recirculation is accomplished by using either pressurized steam or recycled product gas as an entrainment stream. Control of the carrier material circulation rate from the gasification zone provides heat for the devolatilization zone.

The particulate carrier material may be an alumina, aluminosilicate, or similar material having the desired adsorptive properties. Further, the carrier may be promoted to enhance its ability to provide the proper adsorptivity and conversion environment. The desired particle size is between 20 and 200 mesh size (U.S. Sieve Series). The carrier material is continuously recirculated to provide the surface area for tar collection and the means to move the unconverted coal from the devolatilization section to the lower gasification zone. Since the ash produced in the gasification zone is mostly of smaller particle size than the carrier, most of the ash is carried up through the transport tube along with the detarred carrier material and passes out of the reactor with the product gas. Larger ash particles are withdrawn from the bottom zone of the reactor as needed. Minor make-up of carrier material will replace any carrier lost by normal attrition of particles and along with the ash withdrawn from the reactor bottom gasification zone. For extended operations, coke deposits on the carrier material leaving the gasification zone should be limited to about 15 weight percent by the selection of gasification zone operating conditions, and should preferably be maintained between about 2 and 10 weight percent.

The resulting product gas and distillable liquids, along with fine particles or unconverted coal and particulate adsorbent material, are passed from the upper devolatilization zone through a primary gas-solids separation step such as a cyclone separator, where the solids are removed and returned through a conduit to the bottom gasification zone. Fine ash, produced in the lower gasification zone, is conveyed upward along with carrier material by entrainment in pressurized steam or product gas through an up-draft conduit back to the upper bed. Coarse ash particles are withdrawn from the lower bed as needed, preferably in dry instead of molten form.

The resulting effluent gas and liquid products, along with a minor amount of solid particles, are withdrawn and pass through an external gas-solids separation step such as a cyclone separator for further removal of unconverted coal and ash. The effluent gas stream is cooled such as in a separate waste heat boiler to produce steam. The cooled stream is then fractionated to produce separate gas and liquid products.

An alternative process embodiment can provide improvements to this multi-zone coal conversion process to better control the problem of tars in the effluent gas. A third fluidized bed zone can be provided for cooling the effluent gas and also provide for additional deposition of coal tars on the particulate carrier material, and is preferably located directly above the coal devolatilization zone. This third zone of the reactor provides a separate fluidized bed of particullate carrier material and sufficient residence time to permit further reaction of the tars with the up-flowing hydrogen-containing gas generated in the gasification zone. In this uppermost zone, the fluidized bed of particulate carrier surrounds a tubular heat exchanger, such as a waste heat boiler. Pressurized steam can be generated in the boiler by the rising hot effluent from the coal devolatilization zone, and cools the effluent gas from the 900° to 1400° F. temperature range down to 600°-800° F. This gas cooling step serves to condense the carryover tars onto the particulate carrier material. A small stream of tar-containing carrier is passed to the devolatilization zone located below at a rate sufficient to maintain equilibrium tar content on the tar-trapping zone carrier material. The movement of the carrier particles in the upper fluid bed also acts to clean the heat exchanger outer surfaces by abrasion and prevents agglomeration of the tar-containing carrier. In this second embodiment, which provides for a combination tar-trapping/gas-cooling uppermost zone, the clean carrier material is returned from the bottom combustion zone to each of the upper beds through separate conduits by upflowing entrainment gases.

It is an advantage of this invention that it utilizes a circulating particulate carrier material to eliminate the tars produced by coal gasification from the product gas stream and to increase thermal efficiency of the process. The process arrangements or embodiments which are disclosed all employ the concept of fluidized bed devolatilization of coal and fluidized bed gasification of coke and char, using an adsorptive carrier material which is circulating between the beds.

DESCRIPTION OF PREFERRED EMBODIMENTS

Figure 1:
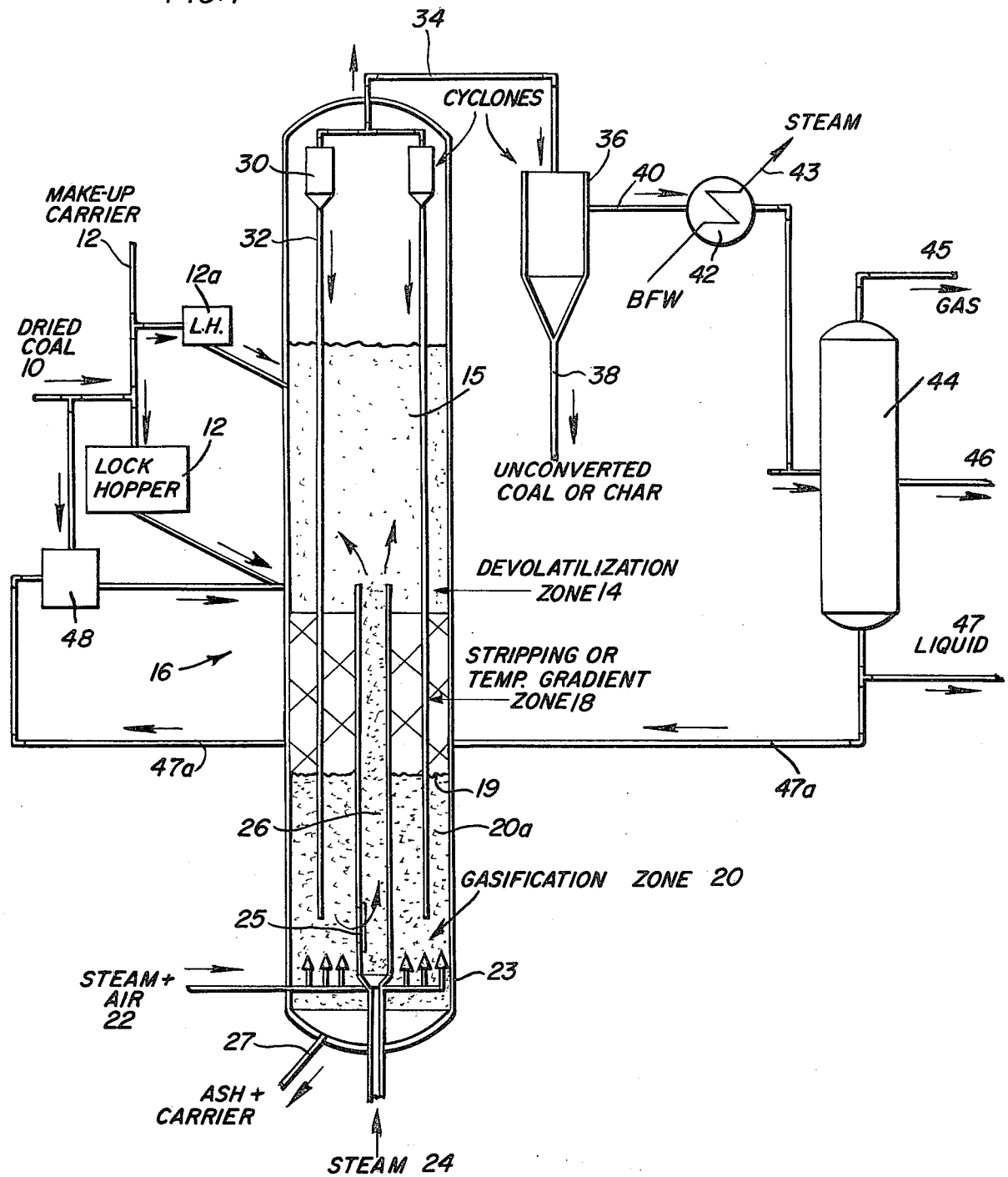
FIG. 1 shows a multiple zone coal conversion process having an upper fluidized bed for coal devolatilization and lower gasification bed separated by a stripping section.

As shown in FIG. 1, ground and dried coal at 10 is introduced through lock hopper 12 to the upper fluidized bed devolatilization zone 14 of multi-zone reactor 16. Zone 14 contains a bed of particulate carrier 15 and is maintained within 900°–1500° F. temperature range so that the coal is devolatilized therein, with the resulting effluent gases and some fine unreacted coal solid particles being carried upward and out of the bed. Tars formed in zone 14 are deposited on the carrier and are hydrocracked to produce hydrocarbon liquids and the resulting coke is retained on the carrier material 15. The larger devolatilized coal solids mix with the particulate carrier containing residual coke and both descend through a packed stripping zone 18 to the lower gasification zone 20, which is maintained at 1700°–2000° F. temperature range. Here the unconverted coal particles (char) and coke are gasified in the presence of steam and air or $O_2$ introduced at 22 through nozzles 23. The coke and some tars formed in the upper zone and retained on the carrier material 15 are also carried to the lower zone 20, where the coke and remaining tars are also gasified and removed from the carrier.

Gasification of char in the lower bed 20a produces ash, most of which is carried along with the particulate carrier material 15, which recirculated to the upper bed 14a by pressurized steam at 24 via the up-transport tube 26. Flow control of carrier material from bed 20a into transport tube 26 at its bottom end is provided by valve opening 25. The carrier material passes through the upper bed 14a and then along with effluent gas to internal primary cyclone separator system 30. The cyclone(s) serve to trap large particle size ash and carrier, and return then via conduit 32 to the lower gasification zone 20, from which coarse ash and some accompanied carrier particles are withdrawn at conduit 27.

Make-up carrier material, as needed, can be added with the coal feed at 12 or through a separate lock hopper system 12a. Circulation of carrier within the reactor zones will also assist in maintaining the coal feed in continuous motion as it undergoes reaction. This circulation prevents agglomeration and minimizes adverse effects created by the rapid heating of coal during its devolatilization in upper fluidized bed zone 14. The selection of the proper particulate carrier material with respect to its particle size, adsorptive characteristics and pore distribution is such as to remove substantially all tars from the gas evolved in the upper devolatilization zone 14.

The stripping zone 18 contains a coarse solid packing material having size at least about 10 times greater than the particulate carrier material, such as ceramic Raschig rings, and is supported by perforated plate 19. This stripping zone creates the temperature gradient needed between the upper and lower fluidized beds, and may also be utilized to strip coal-derived liquids from the descending carrier material. This temperature gradient should be at least 200° F. and is preferably 300°–900° F.

Gas and liquid effluent, along with the minor amount of small particle size unconverted coal and a major portion of small particle size ash, leave the reactor at 34 and pass to an external cyclone solids separation system 36. This step removes the remaining coal and ash particles from the product stream as a disposal stream at 38, which can be returned to lower bed 20a. The resulting cyclone outlet stream 40 is then cooled in waste heat boiler 42, and the cooled gas and liquids are separated by conventional fractionation means at 44 to provide product gas stream 45, light liquid stream 46 and heavier liquid fraction 47. If desired, a portion 47a of this condensed liquid fraction 47 can be used for slurrying the coal at 48 before feeding it into devolatilization zone 14 of reactor 16.

Figure 2:
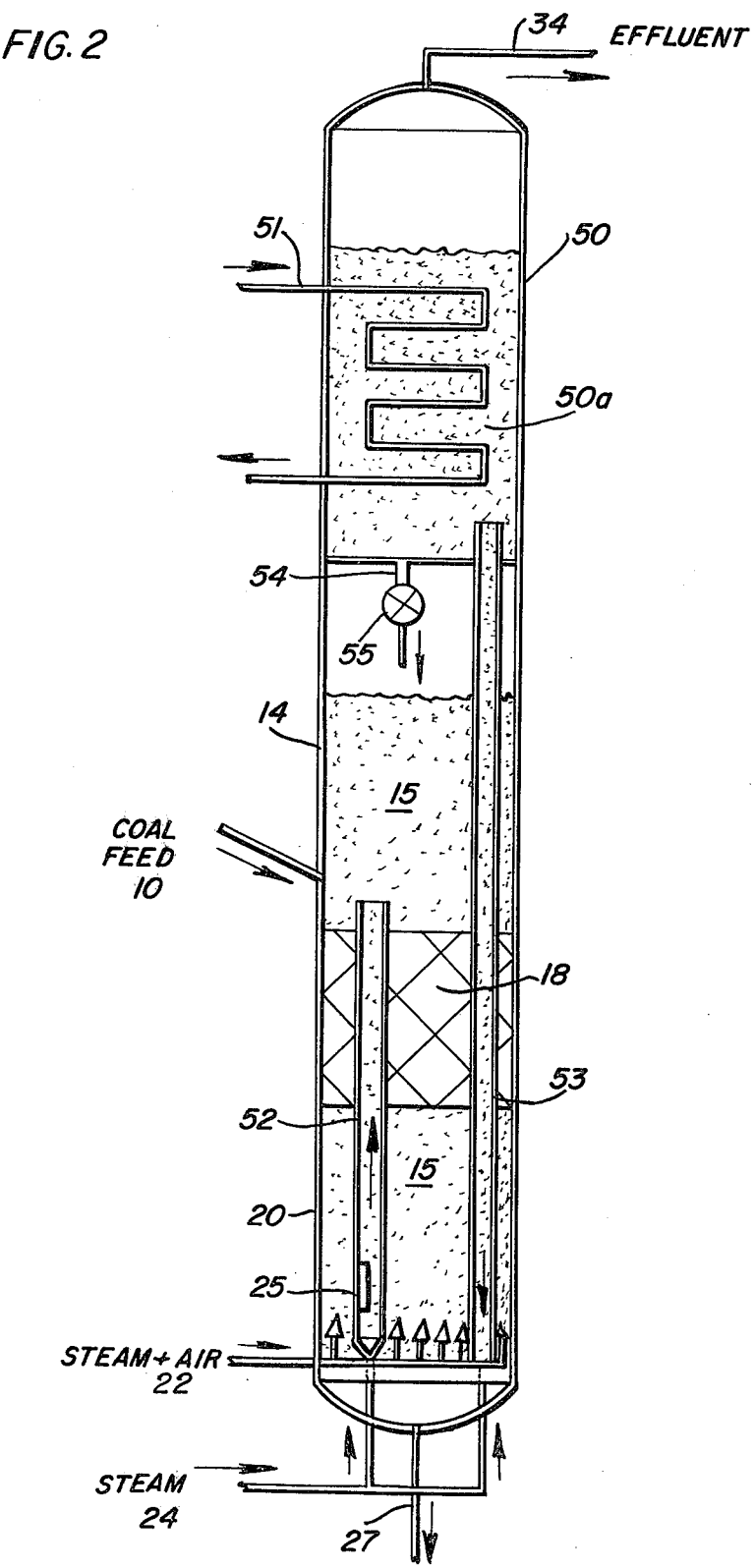
FIG. 2 shows an alternative coal conversion process which provides a third or uppermost zone for cooling the product gas to obtain additional deposition of tars on the carrier material, and in which the cleaned hot carrier material is returned separately to the intermediate and uppermost beds.

FIG. 2 shows an alternative coal conversion process embodiment wherein a third or uppermost fluidized bed zone 50 of particulate carrier material is added above the two fluidized bed zones 14 and 20 shown in FIG. 1. The purpose of this third zone is to provide a fluidized bed type heat exchange for cooling the product gas from the devolatilization zone 14. A cooling fluid 51 such as water can be used to control the temperature of this bed 50a within a desired range, such as 600°–800° F. to adsorb and retain tars on the carrier material in the bed. Separate transport tubes 52 and 53 are used for transferring hot clean carrier solids to the two upper beds, with tube 52 rising to the devolatilization zone and tube 53 to the uppermost heat exchange zone so as to optimize solids circulation to each bed and the waste heat exchanger efficiency. The carrier transport tube 53 extended to the third or uppermost bed supplies carrier material to that bed and insures that fluidization of the bed is maintained. Return conduit 54 with valve 55 is provided to control the return of carrier material to the intermediate zone 14 as needed. If desired, transport tube 53 can be located external to devolatilization bed 14.

This invention will be further illustrated by reference to the following example of coal conversion in a multi-zone reactor to produce gas and distillable liquid products. The example is intended to be illustrative only and should not be construed as limiting the scope of this invention.

EXAMPLE

An experimental two-zone reactor consisting of a 6-inch diameter upper devolatilization or cracking zone containing a bed of circulating particulate carrier material and a 6-inch diameter lower combustion or gasification zone, separated by a packed bed of ceramic Raschig rings and functionally similar to FIG. 1 was used to convert a tar feed material derived from coal, producing a fuel gas and light boiling liquid products. The particulate carrier material used was aluminum oxide pellets having size range of 50 to 200 mesh (U.S. Sieve Series) and produced by Attapulgus Clay Co. under the trade name "Cyclocel". The reactor operating conditions used and results obtained are given in Table 1.

These data indicate that the tars produced during normal devolatilization of coal will be retained in the reactor and converted principally to distillate oils, with lesser amounts of coke formation, and light hydrocarbon gases. About 65 weight percent of the tar feed was converted to distillate oils, 4 percent to light gases and 28 percent to coke on the carrier. In the operation, this coke was gasified continuously in the combustion zone using steam and oxygen so as to maintain the residual coke level on the carrier material at about 5.5 weight percent. These data also show that the tars obtained upon devolatilization of coal in the upper bed can be adsorbed on the carrier material and converted to lighter liquid and gas products without encountering excessive accumulation of carbon on the carrier, which would cause difficulties in extended operation of the system.

TABLE 1

| Run No. | 50-16 |
|---|---|
| Feedstock | Coal Tar |
| Specific Gravity | 1.2677 |
| Gravity, °API | −19.9 |
| Heat Carrier Material | Cyclocel |
| Pressure at Reactor Top, psig | 210 |
| Reactor Temperatures, °F. | |
| Cracking Zone Top | 1138 |
| Gasification Zone | 1730 |
| Coke on Carrier, In Combustion Zone W % | |
| Period Start | 5.2 |
| Period End | 5.5 |
| Product Yields in Cracking Zone, W % of Feed | |
| Methane | 3.3 |
| $C_2$-$C_6$ | 0.7 |
| $C_4$-400° F. Gasoline | 1.9 |
| 400-650° F. Gas Oil | 12.2 |
| 650° F.+ Distillate | 51.3 |
| Coke* | 28.2 |
| Loss | 2.2 |

*Coke is reacted with steam and $O_2$ in gasification zone of reactor to yield additional gaseous products, consisting mainly of $H_2$, CO, and $CO_2$.

Accordingly, it is believed these fluidized bed devolatilization/gasification results for coal tar feed are typical of those obtainable in the multiple fluidized bed conversion processing of coal, and that retention of coke deposits on the carrier, its conduction to the gasification zone, and release of the ash from the carrier upon reaction of the material in the lower gasification zone is operationally feasible.

Although we have disclosed certain preferred embodiments of our invention, it is recognized that modifications can be made thereto and that some features can be employed without others, all within the spirit and scope of the disclosure of the invention, which is defined solely by the following claims.

We claim:
1. A multi-zone coal gasification process for producing fuel gas and distillable liquid products, comprising the steps:
    (a) injecting particulate coal into a pressurized upper fluidized bed devolatilization zone maintained at 900° to 1500° F. temperature range and containing an adsorptive particulate carrier material suitable for deposition of coal tars and coke thereon and on which coke deposits while reacting with an upflowing reducing gas;
    (b) passing the carrier material coated with coke plus unconverted coal solids (char) downward through an intermediate stripping zone into a lower fluidized bed gasification zone;
    (c) injecting steam and oxygen-containing gas into the lower gasification zone to maintain it at 700°-2000° F. temperature range for combustion of the unconverted coal solids and coke deposited on the carrier material and to produce said reducing gas and ash;
    (d) passing said reducing gas upwardly successively through said stripping zone and through said upper bed to fluidize same;
    (e) transferring the clean hot particulate carrier solids from the lower gasification zone upward through a riser conduit into the upper devolatilization zone using a transport gas;
    (f) passing effluent gas from the upper devolatilization zone through a primary separation step for removal of solids, which are returned to the lower fluidized bed;
    (g) withdrawing effluent gas and distillable liquid products from the upper zone; and
    (h) further separating principally ash and unconverted coal solids from the effluent gas and withdrawing them from the process.

2. The process of claim 1 wherein the intermediate stripping zone contains a coarse solid packing material larger than the particulate carrier material and which provides a temperature gradient of at least 200° F. between the upper devolatilization zone and the lower gasification zone.

3. The process of claim 1 wherein the particulate carrier material is alumina of 20-200 mesh size.

4. The process of claim 1 wherein the effluent from the upper zone is cooled and passed to a fractionation step for recovery of gas and distillable liquid products.

5. The process of claim 4 wherein a portion of the product liquid is used to slurry the coal feed to the devolatilization zone.

6. The process of claim 1 wherein the solids separation step (e) for the effluent gas comprises a third fluidized bed of particulate carrier material through which the gas passes for entrapping tars on the carrier, and the carrier material is recirculated from said zone to the devolatilization zone and then to the gasification zone for combustion of the tars deposited therein.

7. The process of claim 6 wherein the third fluidized bed material is maintained at 600°-800° F. temperature by indirect heat exchange with a cooling fluid.

8. The process of claim 1 wherein the pressure in the upper fluidized bed devolatilization zone is at least 100 psig, its temperature is 1000° to 1400° F., and the temperature in the lower gasification zone is 1725°-1950° F.

9. The process of claim 1 wherein the carbon deposited on the carrier material leaving the gasification zone does not exceed about 15 weight percent.

10. A multi-zone coal gasification process for producing fuel gas and distillable liquid products, comprising the steps:
    (a) injecting particulate coal into an upper fluidized bed devolatilization zone maintained at 1000° to 1400° F. temperature range and at least 100 psig pressure, said zone containing an adsorptive particulate alumina carrier material suitable for deposition of coal tars and coke thereon and on which coke deposits while reacting with an upflowing reducing gas;
    (b) passing the carrier material coated with coke plus unconverted coal solids (char) downward through an intermediate stripping zone packed with coarse particulate solids into a lower fluidized bed gasification zone;

(c) injecting steam and oxygen-containing gas into the gasification zone to maintain it at 1725°–1950° F. temperature range for combustion of the unconverted coal solids and coke deposited on the carrier material and to produce said reducing gas and ash;

(d) passing said reducing gas upwardly successively through said stripping zone and through said upper bed to fluidize same;

(e) transferring the clean hot particulate solids from the gasification zone upward through a riser conduit into the upper devolatilization zone using a pressurized transport gas;

(f) passing effluent gas from the upper devolatilization zone through a primary separation step for removal of solids which are returned to the lower fluidized bed;

(g) withdrawing effluent gas and distillable liquid products from the upper zone and passing it to cooling and fractionation steps for recovery of the gas and liquid products; and (h) further separating principally ash and unconverted coal solids from the effluent gas stream and withdrawing said solids from the process.

11. The process of claim 10 wherein the intermediate stripping zone contains a coarse solid packing material having particle size larger than the carrier material and which provides a temperature gradient of 300°–900° F. between the upper devolatilization zone and the lower gasification zone.

12. The process of claim 10 wherein the solids separation step (e) for the effluent gas comprises a third fluidized bed of particulate carrier material through which the gas passes upwardly at low velocity for entrapping tars on the carrier particles, and the coated carrier material therein is first recirculated to the devolatilization zone and then to the gasification zone for combustion of tars deposited on the carrier material.

13. The process of claim 10 wherein some coarse ash solids are withdrawn from the bottom of the gasification zone.

14. The process of claim 10, wherein coke deposited on the particulate carrier in the devolatilization zone is combusted in the gasification zone to not exceeding about 15 weight percent coke remaining on said carrier.

* * * * *